United States Patent [19]

Millies et al.

[11] 3,757,997

[45] Sept. 11, 1973

[54] VARIABLE THICKNESS FOR RECIPROCABLE-TYPE ARTICLE EJECTOR OF A VENDING MACHINE

[75] Inventors: Clarence Fredrick Millies; Loren V. Hughes, both of Cincinnati, Ohio

[73] Assignee: Unlimited Invested Corporation, Cincinnati, Ohio

[22] Filed: Oct. 15, 1971

[21] Appl. No.: 189,707

[52] U.S. Cl. ............................................... 221/241
[51] Int. Cl. ............................................ B65g 59/06
[58] Field of Search .................... 221/271, 276, 241, 221/268, 251

[56] References Cited
UNITED STATES PATENTS

| | | | |
|---|---|---|---|
| 2,105,644 | 1/1938 | Gebert et al. | 221/271 X |
| 3,587,924 | 6/1971 | Di Orio | 221/251 |
| 1,057,158 | 3/1913 | Lynch et al. | 221/241 |

FOREIGN PATENTS OR APPLICATIONS

| | | | |
|---|---|---|---|
| 338,354 | 11/1930 | Great Britain | 221/241 |

*Primary Examiner*—Stanley H. Tollberg
*Attorney*—William V. Miller et al.

[57] ABSTRACT

An adaptor attachment for use in connection with the reciprocable-type ejector of an article vending machine, such as a cigarette package vending machine. It consists of a filler arrangement cooperating with the ejector block upon which the column of articles normally rests and which, upon the retraction stroke of the block, is located underneath and supports the lowermost article in the magazine, preparatory to the advancing or dispensing stroke. The filler is adapted to make it possible for the ejector to eject thinner articles, the vertical extent of the filler plus that of the thinner article it supports being substantially equal to the thickness of the ejector block which was designed to eject the thicker articles.

9 Claims, 12 Drawing Figures

Patented Sept. 11, 1973
3,757,997
3 Sheets-Sheet 1
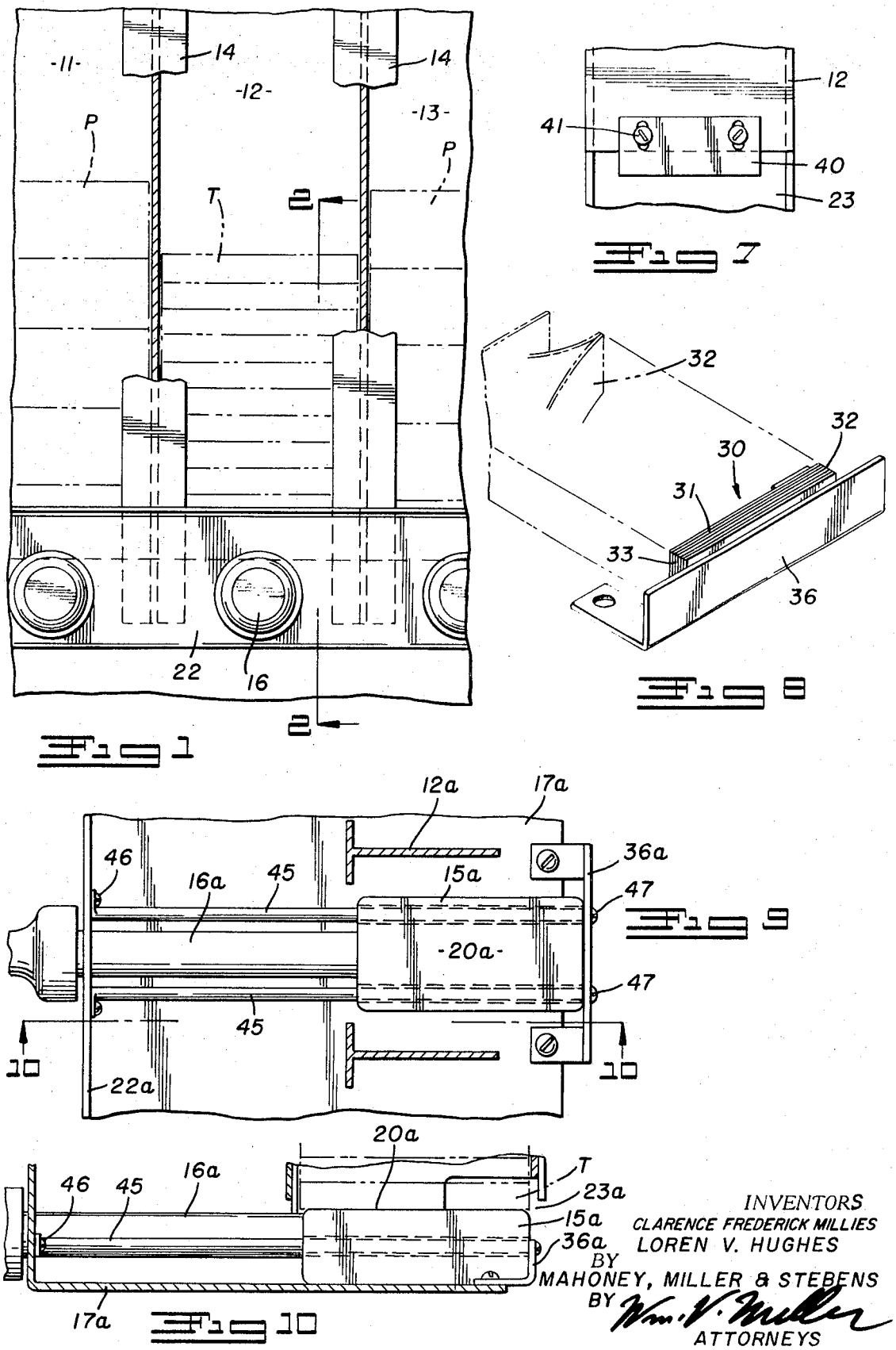
INVENTORS
CLARENCE FREDERICK MILLIES
LOREN V. HUGHES
BY
MAHONEY, MILLER & STEBENS
BY Wm. V. Miller
ATTORNEYS

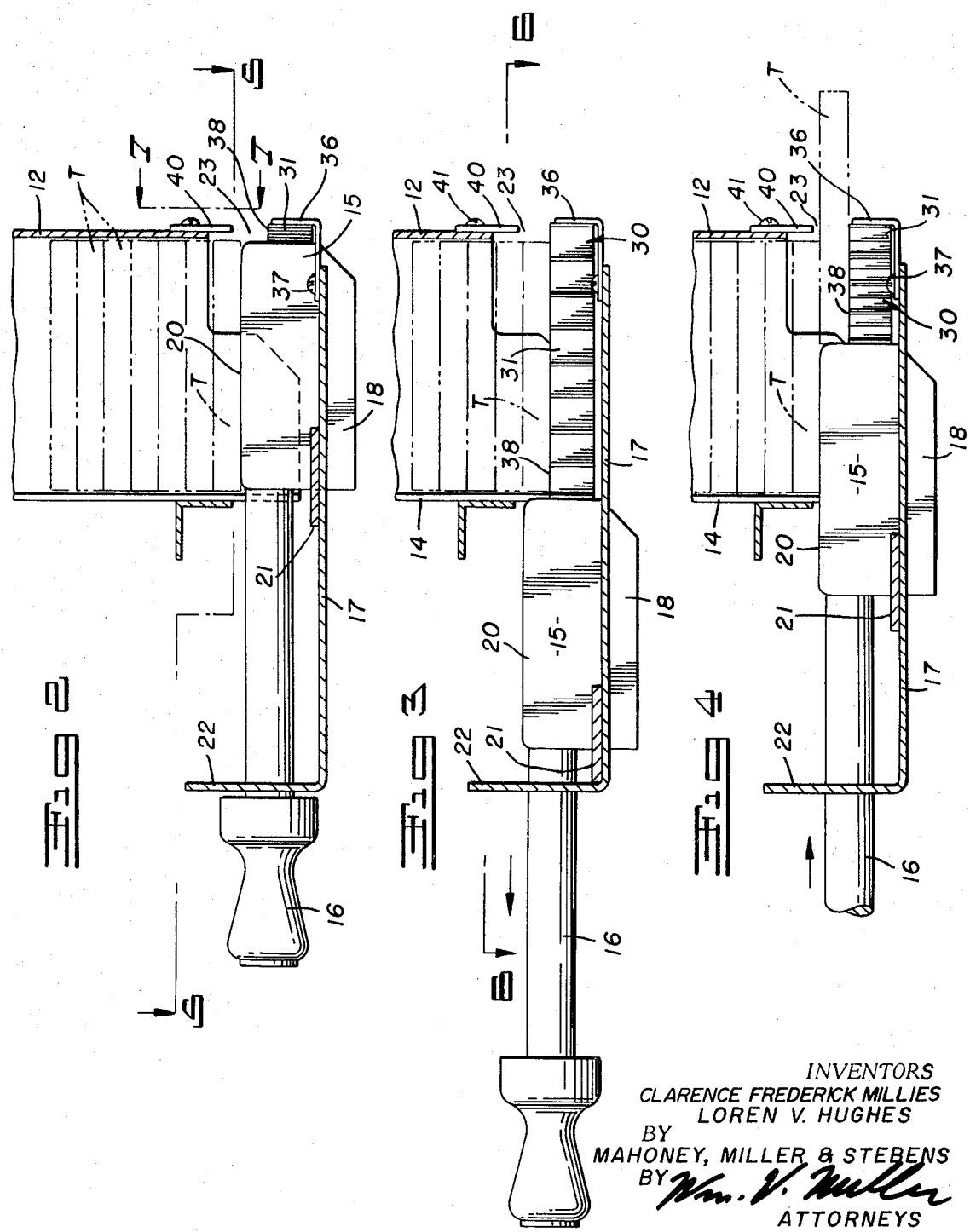

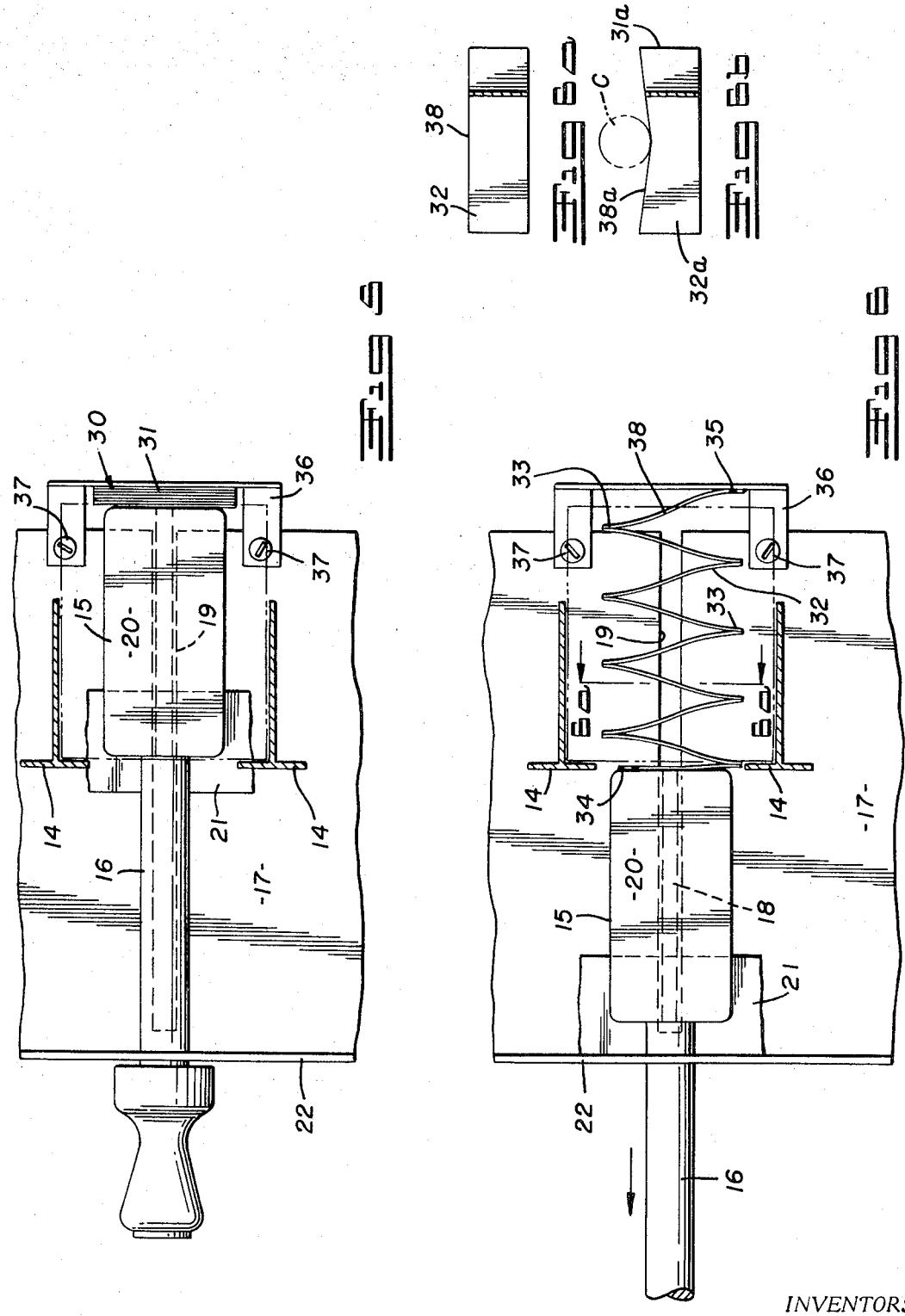

VARIABLE THICKNESS FOR RECIPROCABLE-TYPE ARTICLE EJECTOR OF A VENDING MACHINE

A type of cigarette package vending machine now in use includes an ejector block movable to successively eject the lowermost package from a column of packages superimposed in flat relationship in a magazine. The ejector block is of substantially the same thickness as the individual packages to be ejected and is normally disposed flat at the lowermost end of the magazine with its upper supporting plane engaging the lower face of the lowermost package of the column. In ejecting this lowermost package, the ejector block is retracted, by a plunger arrangement, so that the lowermost package drops to a position in front of it and then, as the ejector is advanced, the package is pushed ahead of it through a discharge passage or slot.

It would be desirable to adapt these cigarette vending machines to the vending of other articles, such as thinner articles or packages. The present invention provides a simple attachment which can be readily applied to the ejector block to adapt it to the vending of thinner articles or packages.

This attachment generally is in the form of a filler arrangement which is so connected to the ejector block that, as the block is retracted to permit the lowermost package or article to drop downwardly into ejecting position, it provides a support which is located at a level to support the article to be ejected so that its upper face and the upper face or supporting plane of the ejector block are in a substantially common plane. Consequently, when the ejector block is advanced to move beneath the next lowermost package or article of the column, the package or article being ejected will be properly advanced through the discharge slot and, during its advance, its upper face will provide a common support plane with the upper face of the ejector block for supporting the next article above, until the time that article is completely supported by the upper face of the ejector block.

The best mode contemplated in carrying out this invention is illustrated in the accompanying drawings in which:

FIG. 1 is a schematic view, partly in elevation, and partly in section, showing a portion of a cigarette vending machine to which this invention may be applied.

FIG. 2 is a vertical sectional view taken substantially along line 2—2 of FIG. 1 and showing one form of adaptor attachment applied to the machine according to this invention, the ejector being shown in its initial column-supporting position.

FIG. 3 is a view similar to FIG. 2, but showing the ejector in retracted position with the filler attachment supporting the column.

FIG. 4 is a similar view, but showing the ejector in its advancing position with the column partially supported by the ejector and the article being ejected.

FIG. 5 is a horizontal sectional view taken along line 5—5 of FIG. 2.

FIG. 6 is a horizontal sectional view taken along line 6—6 of FIG. 3.

FIG. 6a is a transverse vertical sectional view taken along line 6a—6a of FIG. 6.

FIG. 6b is a view similar to FIG. 6a, but showing a different contour on the upper edge of the filler.

FIG. 7 is a vertical sectional view taken along line 7—7 of FIG. 2 illustrating an adjustable stop-plate associated with the discharge slot.

FIG. 8 is a schematic perspective view showing the filler attachment in the position it assumes when the ejector reaches the extent of its advancing movement.

FIG. 9 is a horizontal sectional view showing a different type of filler arrangement associated with the ejector.

FIG. 10 is a vertical sectional view taken along line 10—10 of FIG. 9.

With specific reference to the drawings, in FIG. 1, there is illustrated generally a cigarette package vending machine of a type to which this invention is applicable. However, it is to be understood that the invention is not necessarily limited to this specific type of machine. Only portions of this commonly known machine necessary to the understanding of this invention are illustrated. The machine includes a series of magazines disposed side-by-side and which are adapted to receive columns of articles, such as cigarette packs, for dispensing. In the example shown, these magazines 11, 12 and 13, are illustrated. As originally designed and constructed, the machine will dispense cigarette packages from the respective magazines. These packages are indicated schematically at P in the magazines 11 and 13. However, in some cases, it would be desirable to adapt the machine so that thinner articles or packages could be dispensed from any selected or all of the magazines. In the present example, the attachment of this invention is shown associated with the magazine 12 for dispensing the thinner articles or packages T therefrom.

The design of the machine includes an ejector block 15 reciprocably mounted at the lower end of each of the magazines and movable in a retracting direction by means of a plunger 16 rigidly connected thereto. Spring means (not shown) is usually associated with the plunger for advancing it to its initial column-supporting position in its ejecting stroke. As indicated, each of the magazines is substantially rectangular in cross-section to receive the flat rectangular packages. A vertical slot is provided at the front side of each magazine between opposed inwardly extending retaining flanges 14 which prevent forward movement of the stacked articles from the magazine. The ejector block 15 is of substantially the same thickness as that of the packages P to be dispensed. It is mounted for movement by the plunger 16 along a flat plate 17 the upper surface of which may be termed the ejector plane. The block 15 is provided with a guide tongue 18 (FIG. 2) extending into a guide slot 19 (FIG. 5) in the plate. The lower face of the ejector block 15 slides on this plane surface whereas its upper face 20 is in the initial or normal position of the ejector block (FIG. 2), disposed beneath and in supporting relationship to the lower face of the lowermost package in the magazine with which it cooperates. In its reciprocation or ejection stroke, the block 15 is retracted until a rearwardly extending stop 21 thereon contacts with an upstanding rear stop flange 22 on the plate 17 (FIG. 3). Obviously, the block 15 is of a width to permit it to move through the slot between the opposed flanges 14. In this retracted position of the ejector block 15, the lowermost package in the magazine is free to drop downwardly ahead of the block so that on its return stroke, it will push the article through the discharge slot 23 at the forward side of the magazine directly above the plate 17.

As the machine was originally designed, the package which is ahead of the ejector block 15 would drop down onto the upper surface or ejector plane of the plate 17. However, with the attachment 30 of this invention applied to the machine, filling means is provided for filling up some of the space or pocket which would be occupied by the dropped package. As the ejector block 15 is retracted, this filler means will move beneath the lowermost package to engage its lower surface and support it at a predetermined level above the ejector plane corresponding to the upper surface of the plate 17. The thickness or vertical extent of this filler means, plus the thickness of the thinner package T, will equal the thickness of the thicker package P which is also the thickness of the ejector block 15. This filler means will locate the upper surface 20 of the ejector block and the upper surface of the dropped package T (FIG. 4), in a common plane. Consequently, when the ejector block 15 is advanced, the filler-supported package T will be pushed through the discharge slot 23 and as it is so moved, the upper surface of the package T and the upper surface 20 of the ejector will cooperate to support the next uppermost package T in the column or magazine. Finally, as the package T drops off the supporting filler means 30, the remaining lowermost package T in the magazine will be supported completely by the upper surface 20 of the ejector block 15.

The filler supporting means 30 may take various forms, two of which are indicated in the drawings. In the example shown in FIGS. 1 to 8, the filler means 30 is shown as comprising an accordion-like spring 31 set on edge. This spring is illustrated as comprising a plurality of spring-leaves 32 which are connected to each other such as by a welded joint 33 (FIG. 6) at alternating opposite ends. The result is a spring arrangement which folds like an accordion from the folded condition shown in FIG. 8, where all the leaves are in flat contact, to the expanded condition shown in FIG. 6, where the adjacent leaves are spread and arranged in V-form. One of the outermost leaves is connected at its end 34 to the inner edge of the block 15. The other of the outermost leaves is connected at its opposed end 35 to an upstanding bracket 36. This bracket may be mounted by inwardly extending lugs connected by screws 37 to the edge of the plate 17 adjacent the discharge slot 23. The upper edge of the upstanding portion of this bracket 36 is slightly below the upper edge 38 of the spring 31 (FIGS. 2 to 4).

With this arrangement, it will be apparent that as the plunger 16 is pulled outwardly to retract the block 15, the spring 31 is expanded beneath the magazine 12 and over the surface of the plate 17. Consequently, as the surface 20 moves from beneath the lowermost package T in the magazine, it will drop downwardly until it is supported on the upper edge 38 of the expanded spring 31, as indicated in FIG. 4. Then, as the ejector 15 returns and moves beneath the next lowermost package, it will push the dropped package off the upper edge 38 of the supporting filler spring 31, as indicated in FIG. 4. At the same time, the spring 31 will be folded so that its leaves will be in flat intimate contact, as indicated in FIG. 2. At this time, the leaves of the spring will be upstanding on edges and will occupy a minimum of space between the inner end of the ejector block 15 and the upstanding bracket 36. So that the space occupied by the folded spring will be at a minimum, the leaves 32 of the spring preferably are made of very thin spring steel.

Since the discharge slot 23 on the usual machine is designed for dispensing thicker packages, it must be provided with a stop plate 40 which is mounted by slot and screw connections 41 to the adjacent wall of the magazine 12 for vertical adjustment (FIG. 7). To vary the vertical extent of the slot, this plate 40 will be adjusted into depending relationship over the slot 23 sufficiently to prevent the feeding therethrough of the package T, beneath which the ejector block 15 moves in its ejecting stroke.

In the example just described, the upper edges 38 of the spring leaves 32 are straight across so as to properly support the flat lower face of the package T. However, cylindrical packages C, as indicated in FIG. 6b, could be dispensed by a machine equipped with the filler attachment of this invention and in that case, the spring 31a would have leaves 32a with V-shaped centering upper edges 38a. These edges would locate the cylindrical package C transversely midway of the leaves of the spring, as it unfolds and folds.

In FIGS. 9 and 10, there is illustrated another form of filler arrangement to compensate for the difference in thickness of the thinner articles to be ejected as compared to that of the articles for which the machine was designed. In this case, it comprises a pair of parallel rods 45 disposed at a selected level above the ejector plane plate 17a. One end of each of these rods is fixed at 46 to the upstanding flange 22a at the one edge of the plate 17a. The other end of each of the rods is fixed at 47 to the upstanding bracket 36a which is mounted at the other edge of the plate 17a. In this instance, the ejector block 15a is slidably mounted on the pair of rods 45 which serve as guide means passing through parallel bores extending through the block. As before, the block is reciprocated by means of the plunger rod 16a and associated spring means (not shown), if desired.

It will be apparent that with this arrangement, when the block 15a is retracted from the position shown in FIGS. 9 and 10, the lowermost package T in the magazine 12a will drop down onto the exposed portions of rods 45 so that the package will be supported at the desired level for ejection. Then, as the block 15a is advanced, the package will be pushed off the rods through the discharge slot 23a. The level of the rods 45 is such that they serve as a shelf for the package being ejected so that its upper surface will be in a common plane with the upper surface 20a of the ejector block.

It will be apparent from the above that the filler arrangements provided will fill some of the space which would be occupied by the thicker package. They will lift the plane of ejection of the package a vertical distance equal to the difference in thickness between the package ejected and the package for which the machine was designed. This will result in locating the upper surface of the thinner package being ejected in a common plane with that of the upper surface of the ejector block. Consequently, the ejector will function exactly the same as with the thicker articles.

It will further be apparent that the filler arrangement can be associated with the ejector of machines commonly in use without any substantial changes. In the first form illustrated, it is merely necessary to provide the additional bracket 36 and the spring 31. In the second form, it is merely necessary to provide the bracket 36 and the rods 45 and provide the bores in the block 20a. In each case, a shelf is provided at a higher level for supporting the article being ejected. Different attachments may be provided for various thicknesses of packages to be ejected. The attachments can be readily attached and removed for substitution.

Thus, the present invention provides simple means for adapting commonly used article dispensing or ejecting machines to the dispensing or ejecting of thinner articles than those for which the machine was designed.

The attachment of this invention, as described above, it used on a machine which has a magazine with an outlet end towards which the articles therein are fed. The magazine contains the articles in face-to-face contact. The leading article at the outer end of the magazine is fed toward an ejector or first plane provided by a support extending across the ejector end of the magazine and along which the leading article is adapted to slide with its leading face in contact therewith. The ejecting of the leading article is accomplished by means of an ejector reciprocably mounted on the support for movement from a position where an article-engaging face thereon at a second plane, spaced from the first or ejector plane, engages the leading face of the leading article in the magazine, to a retracted position to permit the leading article to feed into a position ahead of the ejector for ejection by subsequent advancing movement of the ejector which also causes its face to engage the next article in the magazine. The attachment comprises filler means which is of such a nature and so mounted, that, when the ejector moves to its retracted position, a different article-engaging stop is provided for engaging the leading face of the leading article and positioning the article ahead of the ejector. This different article-engaging stop is in a predetermined plane located intermediate the ejector plane, provided by the support, and the article-engaging plane or face of the ejector. This filler means has its article-engaging stop spaced outwardly from the ejector plane of the support a distance which is substantially the difference in thickness between the thinner article being vended with the attachment and that of the article which the machine was constructed to vend.

What is claimed is:

1. An attachment for the ejector mechanism of an article-vending machine which includes a magazine having an ejector reciprocal on an ejector plane provided by a support extending beneath the lower open end of the magazine, said ejector having an upper face movable at a predetermined level above said plane between a position beneath the magazine where it suuports the lowermost article therein to a retracted position to permit the article to drop into a position ahead of the ejector for ejection by subsequent advancing movement of the ejector, said attachment comprising:

filler means having a supporting portion located at a predetermined level above said ejector plane which is exposed upon retracting movement of the ejector from below the lowermost article in the magazine to receive and support said article as it drops ahead of said ejector;

said supporting portion being at a level to support the dropped article with its upper face substantially in a common plane with the upper face of said ejector;

said filler means comprising an accordion-like spring set on edge and having one end fixed to the ejector at its inner side and another end anchored to a fixed support so that it unfolds as the ejector is retracted to support the article on its upper edge and folds flat as the ejector reaches the extent of its ejecting movement.

2. An attachment according to claim 1 in which said support is a flat plate extending from a point outwardly of the magazine to a point adjacent its rear vertical wall where a discharge slot is provided for the dropped article, said filler means including:

an upstanding bracket adjacent the discharge slot to which the one ene of the spring is anchored;

said spring consisting of flat leaves of spring material disposed upright with alternating opposite ends secured together;

the outermost leaves being respectively secured to said ejector and said bracket at opposite ends.

3. An attachment according to claim 2 in which:

said bracket terminates below the upper edge of the spring; and a plate extending down over said discharge opening to change its vertical extent to prevent the next article from feeding therethrough as the dropped article is ejected.

4. An attachment for the ejector mechanism of an article-vending machine to adapt the machine to the vending of thinner articles, said machine including a magazine with an outlet end toward which the articles therein are fed, the magazine containing the articles in face-to-face contact, a support extending across the ejector end of the magazine providing an ejector plane along which the leading face of the leading article is adapted to slide in being ejected, an ejector reciprocably mounted on the support having an article-engaging face thereon spaced from the ejector plane of the support and being reciprocably mounted on the support for movement from a position where its article-engaging face engages the leading face of the leading article in the magazine to a retracted position to permit the leading article to feed into a position on the ejector plane of the support ahead of the ejector for ejection by sub-sequent advancing movement of the ejector which also causes its face to engage the next article in the magazine, said attachment comprising:

filler means mounted in cooperative relationship with said support and said ejector so that when the ejector moves to its retracted position the filler provides a different article-engaging stop for engaging the leading face of the leading article and positioning the article ahead of the ejector, said stop being disposed in a predetermined location intermediate the ejector plane provided by the support and the article-engaging face of the ejector; and said filler means having its article-engaging stop spaced outwardly from the ejector plane of the support a distance which is substantially the difference in thickness between the thinner article being vended with the attachment and that of the article which the machine was constructed to vend.

5. An attachment according to claim 4 in which the magazine of the machine is substantially vertical disposed and, the articles stacked therein are in flat horizontal face-to-face contact, and said support is substantially horizontally disposed and is located below the magazine so that the leading article will drop from the magazine onto the support upon retraction of the ejector, said ejector having its article-engaging face in the form of a supporting surface at its upper side which is spaced above the ejector plane of the support a distance substantially the thickness of the articles which the machine is designed to vend, said ejector having a forward edge for engaging and pushing the dropped article along the ejector plane of the support beyond the magazine to a point of discharge:

said filler means having its article-engaging stop at a level intermediate the ejector plane of the support and the supporting surface at the upper side of the ejector and spaced below that surface a distance corresponding substantially to the thickness of the thinner articles which the machine with the attachment is adapted to vend so as to provide a different ejector plane spaced above the ejector plane of the support.

6. An attachment according to claim 4 including:
a depending plate cooperating with the magazine at the said point of discharge and having a lower extremity spaced above the level of the stop of the filler means to prevent the next article above in the magazine from feeding from the magazine as the ejector moves beneath said article so that its supporting surface engages and supports that article.

7. An attachment according to claim 5 in which said filler means comprises:
an accordion-like spring set on edge above said ejector plane of the support to provide the article-engaging stop at its upper edge and having one end fixed to the ejector at its forward edge and another end anchored to a fixed bracket adjacent said discharge point so that it unfolds as the ejector is retracted to support the article on its upper stop edge and folds flat as the ejector reaches the extent of its ejecting movement.

8. An attachment according to claim 5 in which said filler means comprises:
an additional horizontal support mounted on the first support to provide the article-engaging stop at the intermediate level and extending beneath said magazine;
said ejector being reciprocably mounted on said first support so as to cover the portion of said additional support extending under the magazine when the ejector is moved under the magazine and to expose it when the ejector is retracted so that it can receive and support the dropped article to provide the different ejector plane.

9. An attachment according to claim 8 in which:
said additional horizontal support is in the form of horizontal rods carried at a predetermined level above said first support and extending through bores in said ejector so that the ejector reciprocates relative to said rods.

* * * * *